Feb. 28, 1933.  H. MECOM ET AL  1,899,469
DRILL PIPE JOINT
Filed Dec. 17, 1929
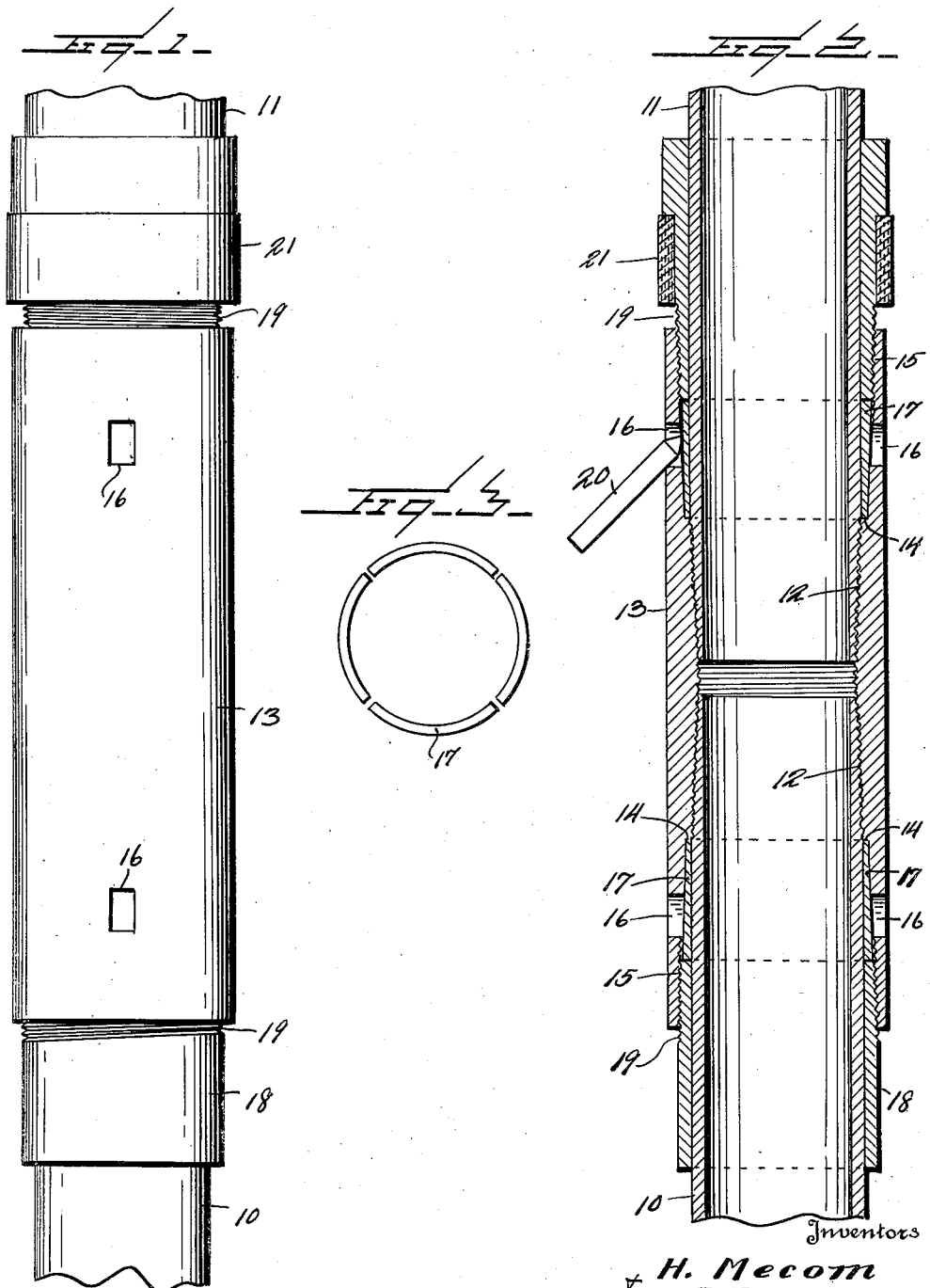
Inventors
H. Mecom
L. J. Black
By Frederick S. Still
Attorney Patented Feb. 28, 1933

1,899,469

UNITED STATES PATENT OFFICE

HARVEY MECOM AND LEE J. BLACK, OF BEAUMONT, TEXAS

DRILL PIPE JOINT

Application filed December 17, 1929. Serial No. 414,748.

This invention relates to means for reinforcing pipe used in oil wells at the joint or coupling, these tool joints being used in making up a drill pipe for a rotary coupling. It is well known that vibration in rotary well drilling soon causes the drill pipe to break, usually at the top of the first thread of a joint. To overcome this, a practice was introduced of upsetting the drill pipe. This upsetting of the drill pipe frequently causes strains which are not easily detected and furthermore, the drill stem guide usually breaks at the end of the upset portion.

Our invention has for one object to strengthen the pipe at the foot of the threads near the end of the joint collar, doing away with the necessity of upsetting with its attendant evils, forging strains and reduction in the cross-sectional area of the bore of the pipe.

A further object is to provide reinforcing wedges disposed between the coupling and the pipe at the root of the threads between the coupling and pipe, the thickness of the reinforcing wedges and the pipe coupling more than doubling the thickness of the pipe and thus getting ample strength to prevent jumping off under vibration, said wedges acting to hold the pipe against any buckling which is the usual cause of breaking at this point. The friction hold of the wedges strengthens the threads on the pipe and prevents the threads from stripping under strain.

A further object is to provide means holding these wedges in place against any longitudinal movement and provide means whereby when the holding means is removed, the wedges may be forced out from between the pipe and the coupling.

Other objects will appear in the course of the following description.

Our invention is illustrated in the accompanying drawing, wherein:—

Figure 1 is a side elevation of a drill pipe joint constructed in accordance with my invention;

Figure 2 is a longitudinal sectional view thereof and showing the manner in which a drift may be inserted to drive out the wedges;

Figure 3 is an end elevation of the series of wedges;

Referring to the drawing, 10 and 11 designate two opposed sections of the drill pipe. These sections have their outer faces at their adjoining ends beveled toward the inner faces and screw-threaded as at 12. These screw-threaded ends of the pipe sections 10 and 11 are engaged with an interiorly screw-threaded coupling 13, this coupling having its interior face beveled from the middle of the coupling outward in opposite directions and interiorly screw-threaded so as to engage the screw-threads 12. The extremities of this coupling are counter-bored as at 14 so that the extremities of the coupling do not touch the pipe sections 10 and 11. This off-set portion 14 is interiorly screw-threaded as at 15 and each off-set portion has a plurality of openings 16 formed therethrough.

Adapted to be disposed between the offset portions 14 and the pipe sections are the wedges 17. Each of these wedges is arcuate in form and there may be as many of these wedges as desired. Four wedges for each end of the coupling is shown. These wedges are tapered toward one end but are not screw-threaded. Holding the wedges in place are the glands 18 which are circular in cross section, these glands having right hand threads 19 engaging with the threads on the inner faces of the offset portions 14 of the coupling 13.

When it is desired to unscrew the pipe sections from the coupling, the glands 18 are unscrewed and then the wedges are forced outward by means of punches or drifts 20 in the manner shown in Figure 2. By turning up on the glands 18, the wedges may be forced inward to any extent required.

It will then be seen that with this construction, the drill pipe is strengthened at the root of the threads 12, which is where the ordinary drill pipe commonly breaks off. It will also be seen that the interior diameter of the pipe sections 10 and 11 is uniform throughout the entire extent of the pipe sections and is not reduced by upsetting and it will be further noted that the combined thickness of the reinforcing wedges and the coupling 13 will more than double the thickness of the metal of the pipe sections, thus giving ample strength to prevent breaking under the extreme vibration to which these drill pipes are subjected. Furthermore the wedges act to hold the pipe sections against buckling which is one of the usual causes of breakage. The friction hold of the wedges 17 will strengthen the engagement of the screw-threads of the pipe and coupling with each other, prevent these screw-threads from stripping and preventing the pipe sections from pulling out of the coupling as in order to pull threads off of the end of the pipe or out of the end of the coupling, it will be necessary to break the threads on the screw gland and release the friction hold of the wedges against the outside of the pipe.

In the construction illustrated, we have provided a pipe coupling or tool joint reinforced against vibrations or lateral strains, also reinforced against longitudinal strains and the stripping of the coupling threads. We have also illustrated a friction ring of rubber designated 21 mounted upon one of the glands 18 and held in place between a shoulder on the gland and the adjacent extremity of the coupling 13. This friction ring or annular cushion 21 is retained in its original position on a joint and cannot slip except to a slight extent. This friction ring will prevent wear on the joint.

We claim:—

1. In a pipe coupling, two end opposed pipe sections tapered toward each other and screw-threaded on said tapered portions, a tubular coupling having its interior flared out from its middle to its ends, the inner end portions of said flaring portions being screw-threaded for engagement with the threads on the tapered portions of the opposed pipe sections, the inner faces of the flared portions of the coupling being plain for a distance beyond the first-named threads and then being screw-threaded, wedges disposed between the plain portions of the coupling and the pipe section outward of the screw-threaded ends thereof, and exteriorly threaded glands having threaded engagement with the outer ends of the flared portions of the coupling and bearing against the wedges, the coupling having drift openings in that portion of the coupling outward of the wedges whereby an instrument may be inserted to drive the wedges out or in.

2. In a pipe coupling, two end opposed pipe sections, a pipe coupling threadably connecting the adjacent ends of the pipe sections near the middle portion of the coupling, the ends of the coupling extending over the pipe sections, the inner face of the coupling outward of said threaded portions being beveled toward the ends of the coupling and said coupling at the outer ends beyond the beveled portion being internally screw-threaded, beveled wedges inserted in the beveled portion between the interior of the coupling and the exterior of the pipe sections, removable screw-threaded glands engaging the threads on the outer ends of the coupling and bearing against said wedges, the coupling having apertures immediately outward of the wedges through which a punch can be inserted for the purpose of driving the wedges out of engagement with the inner wall of the coupling and the outer wall of the pipe section.

In testimony whereof we affix our signatures.

HARVEY MECOM.
LEE J. BLACK.